(12) United States Patent
Gao et al.

(10) Patent No.: US 10,797,845 B2
(45) Date of Patent: Oct. 6, 2020

(54) WIRELESS COMMUNICATION METHOD, ENHANCED NODE B AND USER EQUIPMENT

(71) Applicant: Panasonic Intellectual Property Corporation of America, Torrance, CA (US)

(72) Inventors: Chi Gao, Beijing (CN); Hidetoshi Suzuki, Kanagawa (JP); Masayuki Hoshino, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 34 days.

(21) Appl. No.: 15/600,577

(22) Filed: May 19, 2017

(65) Prior Publication Data

US 2017/0272225 A1    Sep. 21, 2017

Related U.S. Application Data

(63) Continuation of application No. PCT/CN2015/072434, filed on Feb. 6, 2015.

(51) Int. Cl.
*H04W 4/00* (2018.01)
*H04L 5/00* (2006.01)
(Continued)

(52) U.S. Cl.
CPC .......... *H04L 5/0053* (2013.01); *H04L 1/0046* (2013.01); *H04L 1/08* (2013.01);
(Continued)

(58) Field of Classification Search
None
See application file for complete search history.

(56) References Cited

U.S. PATENT DOCUMENTS

| | | | |
|---|---|---|---|
| 2011/0200004 A1 | 8/2011 | Nakashima et al. | |
| 2011/0280203 A1* | 11/2011 | Han | H04L 1/0031 370/329 |

(Continued)

FOREIGN PATENT DOCUMENTS

| | | |
|---|---|---|
| WO | 2010/050105 A1 | 5/2010 |
| WO | 2014/109621 A1 | 7/2014 |

(Continued)

OTHER PUBLICATIONS

International Search Report of PCT application No. PCT/CN2015/072434 dated Nov. 20, 2015.

(Continued)

*Primary Examiner* — Bob A Phunkulh
(74) *Attorney, Agent, or Firm* — Seed IP Law Group LLP (57) ABSTRACT

Provided are wireless communication methods, an eNB and a UE. A wireless communication method performed by the eNB includes transmitting repetitions of control channel(s) in a control region to a first UE in a coverage enhancement level, wherein the control region includes multiple sub-regions each of which can be used to transmit repetitions of one control channel; possible sub-region(s) allocated from the multiple sub-regions for transmitting one control channel to the first UE in the coverage enhancement level start from the same subframe; and the possible sub-region(s) for the first UE in the specific coverage enhancement level constitute a subset of a set of available sub-regions for the coverage enhancement level in the eNB's perspective.

8 Claims, 4 Drawing Sheets

(51) Int. Cl.
*H04W 16/26* (2009.01)
*H04L 1/08* (2006.01)
*H04L 1/00* (2006.01)
*H04W 48/12* (2009.01)
*H04W 72/04* (2009.01)

(52) U.S. Cl.
CPC .......... *H04W 16/26* (2013.01); *H04W 48/12* (2013.01); *H04W 72/042* (2013.01); *H04W 72/0406* (2013.01)

(56) References Cited

U.S. PATENT DOCUMENTS

| | | | |
|---|---|---|---|
| 2013/0223402 A1* | 8/2013 | Feng | H04L 5/0007 370/330 |
| 2014/0086112 A1* | 3/2014 | Stern-Berkowitz | H04W 72/1289 370/280 |
| 2014/0146775 A1* | 5/2014 | Guan | H04L 5/0053 370/329 |
| 2014/0233470 A1 | 8/2014 | Kim et al. | |
| 2015/0016312 A1* | 1/2015 | Li | H04W 74/0833 370/280 |
| 2015/0181440 A1* | 6/2015 | Chen | H04W 16/18 370/329 |
| 2015/0245323 A1* | 8/2015 | You | H04W 72/042 370/329 |
| 2016/0142981 A1* | 5/2016 | Yi | H04J 11/0069 455/522 |
| 2016/0205571 A1* | 7/2016 | Yi | H04L 1/1812 370/252 |
| 2016/0234810 A1* | 8/2016 | Wong | H04W 48/12 |
| 2016/0242203 A1* | 8/2016 | You | H04W 4/70 |
| 2016/0249331 A1* | 8/2016 | Park | H04L 1/1819 |
| 2016/0278054 A1* | 9/2016 | You | H04L 5/0053 |
| 2016/0302080 A1* | 10/2016 | Hwang | H04W 4/70 |
| 2016/0330723 A1* | 11/2016 | Gao | H04B 7/26 |
| 2016/0345117 A1* | 11/2016 | Nguyen | H04W 4/70 |
| 2016/0353440 A1* | 12/2016 | Lee | H04W 72/0453 |

FOREIGN PATENT DOCUMENTS

| | | |
|---|---|---|
| WO | 2014/110781 A1 | 7/2014 |
| WO | 2014/204285 A1 | 12/2014 |

OTHER PUBLICATIONS

Extended European Search Report, dated Feb. 7, 2018, for the related European Patent Application No. 15880758.6-1219 / 3254488, 8 pages.

MediaTek Inc., Analysis of (E)PDCCH enhancements and timing relationship with PDSCH [online], 3GPP TSG-RAN WG1 #74b R1-134444, Sep. 28, 2013, Retrieved from the internet:URL:http://www.3gpp.org/ftp/tsg_ran/WG1_RL1/TSGR1_74b/Docs/R1-134444.zip [retrieved on Sep. 7, 2018], Proposal #3.

ZTE, Discussion on (E)PDCCH Coverage Improvement [online], 3GPP TSG-RAN WG1 #76 R1-140277, Feb. 1, 2014, [Search date Apr. 2, 2019], Internet<URL:http://www.3gpp.org/ftp/tsg_ran/WG1_RL1/TSGR1_76/Docs/R1-140277.zip>, Section 2.1.

Ericsson, Impact of coverage enhancements on RAN [online], 3GPP TSG-RAN WG2 #85 R2-140675, Jan. 31, 2014, [Search date Apr. 2, 2019], Internet<URL:http://www.3gpp.org/ftp/tsg_ran/WG2_RL2/TSGR2_85/Docs/R2-140675.zip>, Section 2.1.1, Fig.1.

* cited by examiner

WIRELESS COMMUNICATION METHOD, ENHANCED NODE B AND USER EQUIPMENT

BACKGROUND

1. Technical Field

The present disclosure relates to the field of wireless communication, and in particular, to wireless communication methods, an eNode B (eNB) and a user equipment (UE).

2. Description of the Related Art

Machine-Type Communication (MTC) is an important revenue stream for operators and has a huge potential from the operator perspective. Based on the market and operators' requirements, one of the important requirements of MTC is improving the coverage of MTC UEs. To enhance the MTC coverage, almost all of the physical channels need to be enhanced. Repetition in time domain is the main method to improve the coverage of the channels. At the receiver side, the receiver combines all the repetitions of the channel and decodes the information.

Another requirement of MTC is power consumption reduction at UE side. One efficient method to reduce the power consumption is to reduce the active time of UE, in other words, to reduce UE's unnecessary blind detection, reception and transmission.

SUMMARY

In one general aspect, the techniques disclosed here feature a wireless communication method performed by an eNode B (eNB), including transmitting repetitions of control channel(s) in a control region to a first user equipment (UE) in a coverage enhancement level, wherein the control region includes multiple sub-regions each of which can be used to transmit repetitions of one control channel; possible sub-region(s) allocated from the multiple sub-regions for transmitting one control channel to the first UE in the coverage enhancement level start from the same subframe; and the possible sub-region(s) for the first UE in the specific coverage enhancement level constitute a subset of a set of available sub-regions for the coverage enhancement level in the eNB's perspective.

According to the present disclosure, it is possible to reduce the UE's power consumption, decrease the number of blind decoding and reduce buffer size.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

Figure 1:
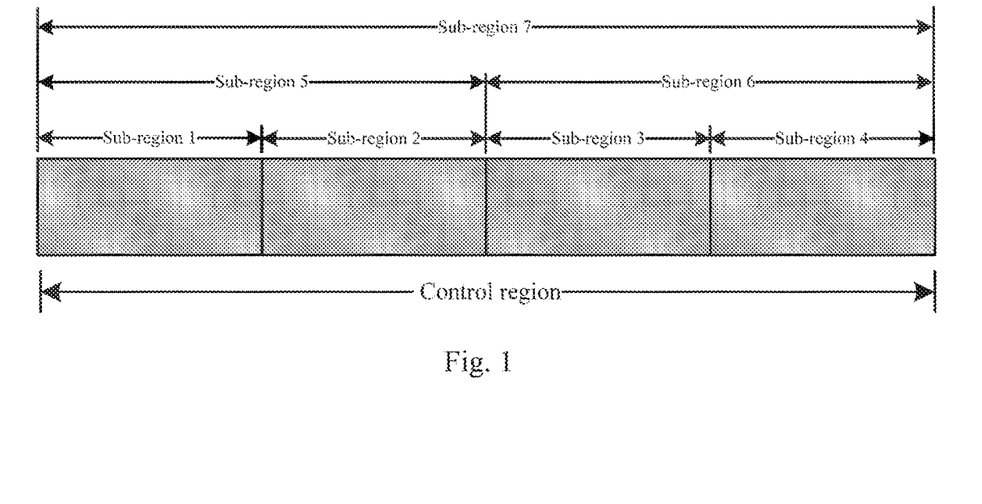
FIG. 1 schematically illustrates an exemplary control region according to an embodiment of the present disclosure.

As described in the background, in order to reduce power consumption at UE side for MTC, an efficient way is to reduce UE's unnecessary blind detection, reception and transmission. For this purpose, a control region for MTC can be defined to transmit control channel(s), as exemplarily illustrated in FIG. 1 which schematically illustrates an exemplary control region according to an embodiment of the present disclosure. The control region can be transmitted periodically. Therefore, MTC UEs only need to wake up in the control region to monitor their respective control channels and do not need to be active in every subframe. The control region is mapped onto multiple subframes, and there can be multiple sub-regions in the control region some of which may be overlapped. Each sub-region can be used to transmit repetitions of one control channel such as PDCCH (Physical Downlink Control Channel). In the example of FIG. 1, there are 7 sub-regions in the control region. It is noted that the sub-region division in FIG. 1 is just an example, and other division manner of sub-regions is also possible. In addition, the illustrated sub-regions are mapped onto continuous logical indices of subframes, but the mapping of logical indices to physical indices of subframes can be localized or distributed.

Based on the control region concept, solutions to the search space for MTC UEs are proposed in the present disclosure. According to the proposed solution, UE's active time and blind decoding time will be reduced a lot. In the present disclosure, MTC may be taken as an example to describe the principle of the present disclosure; however, it is noted that the wireless communication methods disclosed in the present disclosure can not only be applied to MTC, but also be applied to other wireless communications such as other communications conforming to LTE specifications as long as those wireless communications transmit control channel(s) repeatedly. Accordingly, the UEs are not limited to MTC UEs, but can be any other UEs that can perform the communication methods described in the present disclosure.

Figure 2:
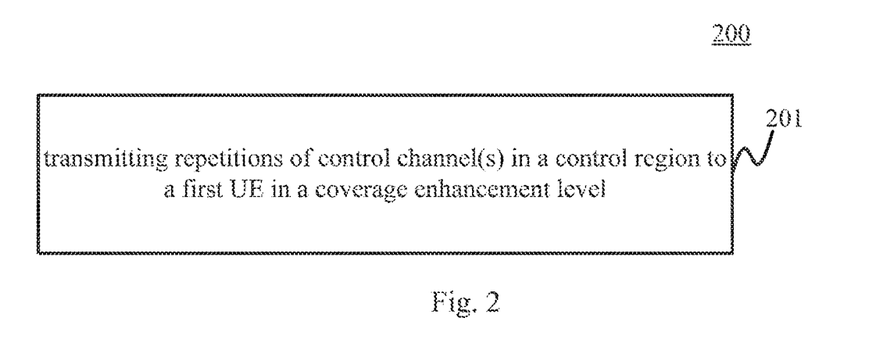
FIG. 2 schematically illustrates a flowchart of a wireless communication method performed by an eNB according to an embodiment of the present disclosure.

In an embodiment of the present disclosure, there is provided a wireless communication method 200 performed by an eNB, as shown in FIG. 2 which schematically illustrates the flowchart of the wireless communication method 200 according to an embodiment of the present disclosure.

The wireless communication method 200 includes a step 201 of transmitting repetitions of control channel(s) in a control region to a first UE in a coverage enhancement (CE) level. In the step 201, one or more control channels (also referred to as control channel(s)) can be transmitted repeatedly in a control channel such as the control channel shown in FIG. 1. The control region includes multiple sub-regions each of which can be used to transmit repetitions of one control channel. In the exemplary control region shown in FIG. 1, there are seven sub-regions. Some of the sub-regions can be overlapped with each other. For example, the sub-region 1, sub-region 5 and sub-region 7 in FIG. 1 are overlapped with each other. Here, the "coverage enhancement level" refers to the largest repetition number of transmission for a specific channel. According to the application scenarios such as the channel condition, there can be several available coverage enhancement levels for the eNB to transmit a control channel. If the eNB chooses a lower coverage enhancement level to transmit a control channel repeatedly, fewer subframes can be reserved for the repeated transmission. In other words, a smaller sub-region can be reserved for the lower coverage enhancement level. From system's perspective (i.e. from the eNB's perspective, or for all possible receiving UEs), the eNB can transmit a control channel in one sub-region selected from a set of available sub-regions that are constituted by part or all of the multiple sub-regions of the control region for each coverage enhancement level. Taking the control channel shown in FIG. 1 as an example, from system's perspective, for coverage enhancement level 1 (the lowest level here), the control channel can be transmitted in sub-region 1, 2, 3 or 4; for coverage enhancement level 2, the control channel can be transmitted in sub-region 1, 2, 3, 4, 5 or 6; for coverage enhancement level 3 (the highest level here), the control channel can be transmitted in sub-region 1, 2, 3, 4, 5, 6 or 7. Table 1 lists the above exemplary available sub-region assignment.

TABLE 1

| Coverage enhancement level | Available sub-regions |
| --- | --- |
| Level 1 | sub-region 1, 2, 3, 4 |
| Level 2 | sub-region 1, 2, 3, 4, 5, 6 |
| Level 3 | sub-region 1, 2, 3, 4, 5, 6, 7 |

In the wireless communication method 200, from the UE's perspective (that is, for a specific UE), possible sub-region(s) for transmitting one control channel to the specific UE in a specific coverage enhancement level are selected from the set of available sub-regions for the specific coverage enhancement level from the eNB's perspective, and the possible sub-region(s) all start from the same subframe. It is noted that the term of "sub-region(s)" herein means that the number of the possible sub-region(s) can be one or more, and if the number of the possible sub-region(s) is more than one, the possible sub-regions start from the same subframe. In other words, the possible sub-region(s) for a specific UE in a specific coverage enhancement level constitute a subset of the set of available sub-regions for the specific coverage enhancement level for all possible receiving UEs. In conclusion, in the wireless communication method 200, possible sub-region(s) allocated from the multiple sub-regions for transmitting one control channel to the first UE in the coverage enhancement level start from the same subframe; and the possible sub-region(s) for the first UE and the specific coverage enhancement level constitute a subset of a set of available sub-regions for the coverage enhancement level in the eNB's perspective, that is, the set of available sub-regions are constituted by part or all of the multiple sub-regions of the control region, and from the eNB's perspective, any sub-region from the set of available sub-regions can be used by the eNB to transmit one control channel in the coverage enhancement level.

In the exemplary control region shown in FIG. 1, for example, for the UE in coverage enhancement level 1, the possible sub-region can include only one sub-region, e.g., sub-region 1 (or sub-frame 2, 3, or 4); for the UE in coverage enhancement level 2, the possible sub-regions can include two sub-regions, e.g., sub-region 1 and sub-region 5 (or sub-frame 3 and sub-frame 6); for the UE in coverage enhancement level 3, the possible sub-region can include three sub-regions, e.g., sub-region 1, sub-region 5 and sub-region 7. It can be seen from FIG. 1 that, for each coverage enhancement level, the possible sub-regions start from the same subframe. For example, for coverage enhancement level 2, sub-region 1 and sub-region 5 start from the same subframe; and for coverage enhancement level 3, sub-region 1, sub-region 5 and sub-region 7 start from the same subframe. In other words, for each coverage enhancement level, there are different alternative subsets of sub-regions for transmitting a control channel from the eNB's perspective, and each UE in a certain coverage enhancement level monitors one alternative subset as listed in Table 2 for the exemplary control region of FIG. 1.

TABLE 2

| Coverage enhancement level | Alternative subsets of sub-region(s) |
| --- | --- |
| Level 1 | Alt.1: sub-region 1; |
| | Alt.2: sub-region 2; |
| | Alt.3: sub-region 3; |
| | Alt.4: sub-region 4 |
| Level 2 | Alt.1: sub-region 1 + sub-region 5; |
| | Alt.2: sub-region 3 + sub-region 6 |
| Level 3 | Alt.1: sub-region 1 + sub-region 5 + sub-region 7 |

Figure 3:
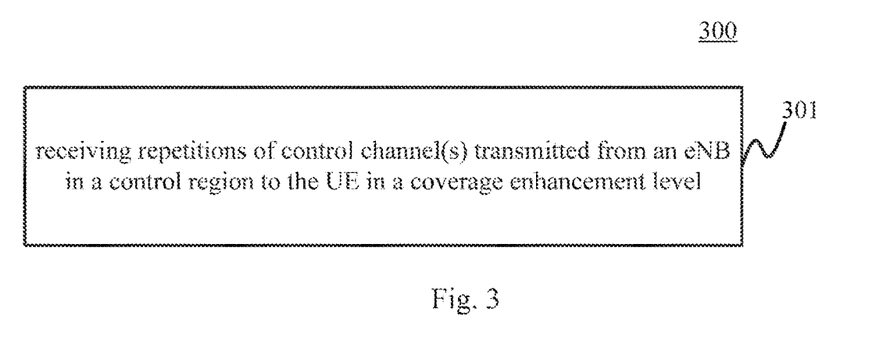
FIG. 3 schematically illustrates a flowchart of a wireless communication method performed by a UE according to an embodiment of the present disclosure.

Since the possible sub-region(s) used by the eNB to transmit repetitions of a control channel to a specific UE start from the same subframe, at the UE side, the possible sub-region(s) that the UE in the coverage enhancement level needs to monitor for the control channel also start from the same subframe. In other words, the UE does not need to monitor the whole control region for the control channel, but only monitors specific sub-region(s) starting from the same subframe. Accordingly, an embodiment of the present disclosure provides a wireless communication method 300 performed by a UE (first UE), as shown in FIG. 3 which schematically illustrates the flowchart of the wireless communication method 300 according to an embodiment of the present disclosure. The wireless communication method 300 includes a step 301 of receiving repetitions of control channel(s) transmitted from an eNB in a control region to the UE in a coverage enhancement level, wherein the control region includes multiple sub-regions each of which can be used to transmit repetitions of one control channel; possible sub-region(s) that the UE in the coverage enhancement level needs to monitor for one control channel in one control region start from the same subframe; and the possible sub-region(s) for the UE in the specific coverage enhancement level constitute a subset of a set of available sub-regions for the coverage enhancement level in the eNB's perspective. It is noted that the above descriptions for the method 200 can also be applied to the method 300, which will not be described in detail.

According to the above wireless communication methods provided by embodiments of the present disclosure, a plurality of benefits can be achieved. First, it is possible to reduce the UE's power consumption. The UE does not need to monitor the whole control region for its control channel, and the UE is active only during the transmission time of repetitions. Therefore, no unnecessary active time is powered on. Second, it is possible to decrease the number of blind decoding. Taking the control region as shown in FIG. 1 and Table 1 as an example, according to the present disclosure, at most 3 blind decoding is enough. However, if all the sub-regions in Table 1 should be monitored by one UE, the maximum blind decoding number will be 7. Third, no extra buffer is needed but only one buffer is enough since all the possible sub-frames that one UE needs to monitor start from the same subframe. In contrast, if a UE needs to monitor for example sub-regions 1, 2, 3, 4, 5 and 6, then the UE needs to buffer sub-regions 2 and 5 simultaneously and it needs double size of the buffer.

In an optional embodiment of the present disclosure, the possible sub-region(s) can be configured by signaling such as physical layer signaling or RRC (Radio Resource Control) signaling. In other words, which alternative subset of sub-frame(s) is used for the UE can be configured by signaling, and then the UE knows which sub-frame(s) should be monitored.

Alternatively, the possible sub-region(s) can be implicitly indicated by a UE index of the receiving UE (the first UE). The UE index can be an RNTI (Radio Network Temporary Identifier) or any other index to identify the UE. For example, the UE can monitor alternative subset with index of $\mod(n_{idx}, n_L)+1$ for coverage enhancement level L, where $n_{idx}$, is the UE index, and $n_L$ is the number of alternative subsets for coverage enhancement level L. For instance, the UE with index #30 can monitor alternative subset with index of mode (30, 4)+1 for coverage enhancement level 1, that is, Alt.3 (i.e., sub-region 3) in Table 2. Similarly, for coverage enhancement level 2, the UE with index #30 can monitor Alt. 1 (i.e., sub-regions 1 and 5), and for coverage enhancement level 3, the UE with index #30 can monitor Alt. 1 (i.e., sub-regions 1, 5 and 7). According to this embodiment, no more signaling is needed.

Further, in an embodiment of the present disclosure, the first UE can monitor UE index(es) of at least one second UE in addition to the UE index of the first UE in the possible sub-region(s) of the first UE in one control region, the UE index of the first UE and the UE index(es) of the at least one second UE can be used to indicate information on the control channel transmitted to the first UE, and the possible sub-region(s) that the at least one second UE monitors have a different starting subframe from the possible sub-region(s) the first UE monitors. According to this embodiment, if the alternative subset (first alternative subset) for one UE (e.g. the first UE) has a different starting subframe from that of the alternative subset (second alternative subset) for another UE (a second UE), then both the UE indexes of the at least two UEs can be used by the eNB to indicate information on the control channel (for example, the type of the control information (e.g. DCI)) transmitted to the first UE in the possible sub-region(s) for the first UE. Now, the first UE monitors its own UE index (first UE index) and the UE index (second UE index) of the second UE in the first alternative subset of sub-region(s) allocated to the first UE in the CE level. When the first UE detects control information in the possible sub-region(s) for the first UE assuming it is scrambled by the first UE index successfully, the control information is type 1 control information for the first UE. When the first UE detects control information in the possible sub-region(s) for the first UE assuming it is scrambled by the second UE index successfully, the control information is type 2 control information for the first UE, wherein the control information of type 2 is different from type 1. Conventionally, the control information scrambled by the second UE index is not for the first UE, and the first UE does not decode it. However, in the example of the present disclosure, since the starting subframe of the first alternative subset is different from the starting subframe of the second alternative subset, the control channel transmitted in the first alternative subset cannot be for the second UE, and the second UE would not monitor a control channel in the first alternative subset of sub-region(s). Therefore, the second UE index can be reused in the first alternative subset for the first UE to indicate information on the control channel being transmitted to the first UE. With this embodiment, the UE can monitor multiple types of control information without adding new indexes (e.g., RNTI). This can be a way of saving RNTI resource.

Figure 4:
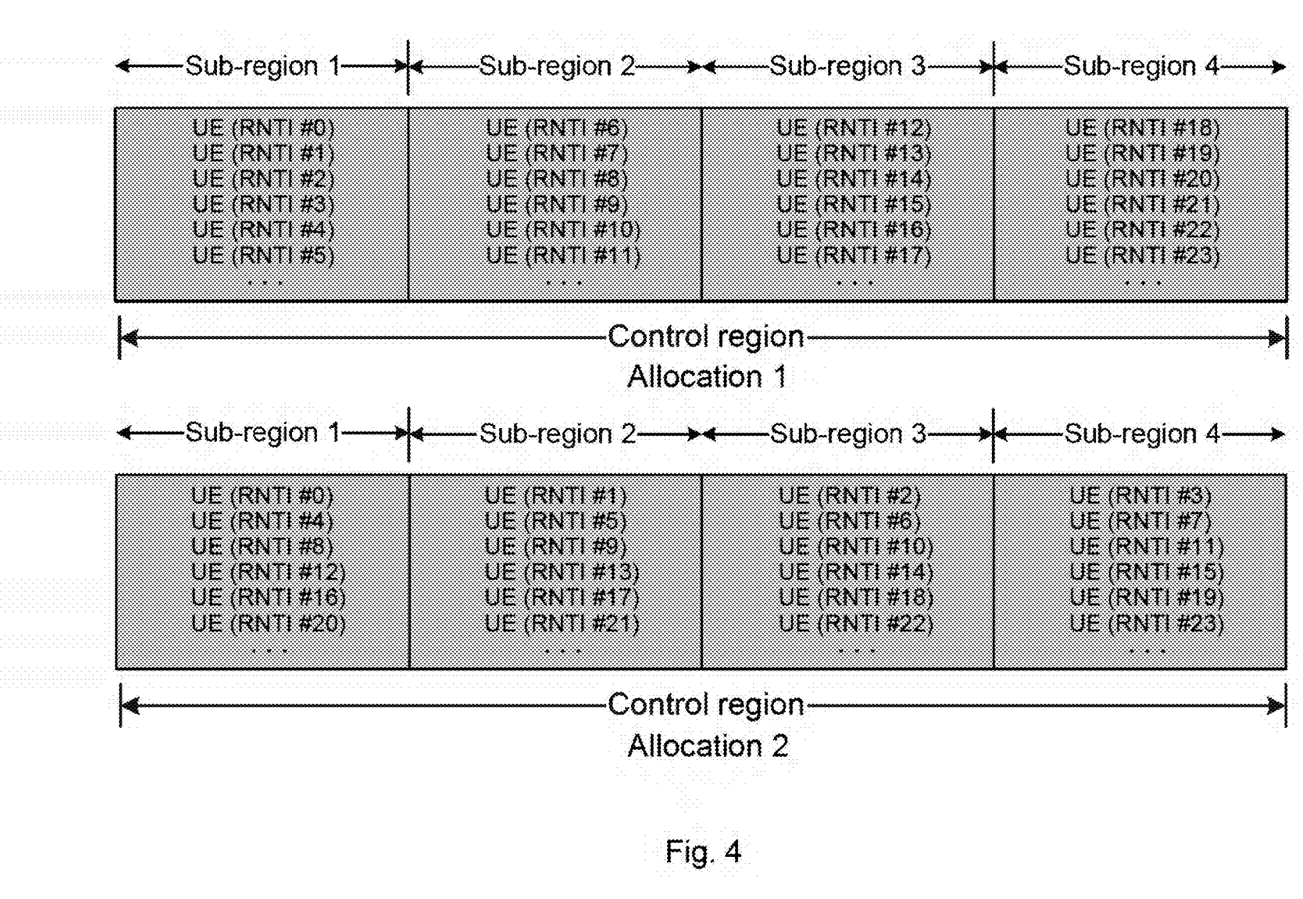
FIG. 4 schematically illustrates exemplary allocations of the UEs into sub-regions according to an embodiment of the present disclosure.

As a specific example of the above embodiment, for a specific coverage enhancement level L (for example, Level 1 in the example of FIG. 1 and Table 2), the UEs are allocated into M (e.g. 4) sub-regions which are not overlapped with each other. FIG. 4 schematically illustrates two exemplary allocation ways of the UEs into sub-regions. In this example, one UE will only monitor one specific sub-region, but the UE monitors not only its own RNTI but also some RNTIs of other UEs allocated to other M−1 sub-regions to obtain its control information (e.g., DCI). Different RNTIs indicate different control information type indexes. Table 3 shows one example of the indication of the control information types by RNTIs in different monitoring sub-regions by taking the allocation 2 shown in FIG. 4 as an example.

TABLE 3

|  | Monitoring sub-region | Control information type index | RNTI used for scrambling |
| --- | --- | --- | --- |
| UE with RNTI #0 | Sub-region 1 | Type 1 (e.g., DL grant) | RNTI #0 |
|  |  | Type 2 (e.g., RAR) | RNTI #1 |
|  |  | Type 3 (e.g., Paging) | RNTI #2 |
|  |  | Type 4 ( . . . ) | RNTI #3 |
| UE with RNTI #1 | Sub-region 2 | Type 1 | RNTI #1 |
|  |  | Type 2 | RNTI #0 |
|  |  | Type 3 | RNTI #2 |
|  |  | Type 4 | RNTI #3 |
|  |  | . . . |  |
| UE with RNTI #4 | Sub-region 1 | Type 1 | RNTI #4 |
|  |  | Type 2 | RNTI #5 |
|  |  | Type 3 | RNTI #6 |
|  |  | Type 4 | RNTI #7 |
|  |  | . . . |  |

As can be seen from Table 3, for example, the UE with RNTI #0 will monitor RNTI #0, #1, #2 and #3 in sub-region 1. If the control channel is decoded successfully by RNTI #0, then the control channel is Type 1 DCI; if the control channel is decoded successfully by RNTI #1, then the control channel is Type 2 DCI; and so on. Therefore, the UE can monitor multiple types of control information without adding new RNTIs, which saves RNTI resource.

In addition, in another embodiment of the present disclosure, the above method 200 can further include transmitting repetitions of a data channel in a sub-region of a data region to the first UE, and the above method 300 can further include receiving repetitions of a data channel transmitted from the eNB in a sub-region of a data region. The sub-region for the data channel can be related to the sub-region for the control channel scheduling the data channel, or the information on the sub-region for the data channel can be signaled in the control channel scheduling the data channel. The data channel is scheduled by the control channel.

Figure 5:
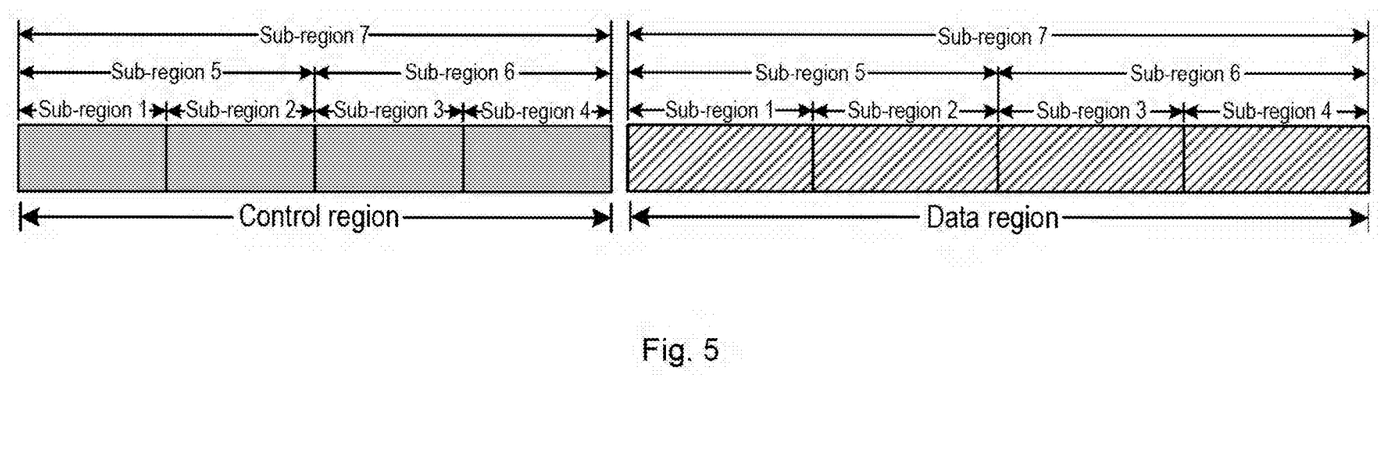
FIG. 5 schematically illustrates an exemplary control region and an exemplary data channel according to an embodiment of the present disclosure.

FIG. 5 schematically illustrates a control region and a data region according to an embodiment of the present disclosure. In FIG. 5, the division of sub-regions in the control channel and the data channel is the same, but the present disclosure is not limited to that. The division of sub-regions in the data channel can be different from that in the control channel. In the following, several specific examples of this embodiment are described.

In a first example, the sub-region of the transmitted control channel (for example PDCCH) and the sub-region of the transmitted data channel scheduled by the control channel are in one to one mapping. One instance is as exemplarily shown in Table 4 below.

TABLE 4

| Control channel (in control region) | Scheduled data channel (in data channel) |
| --- | --- |
| sub-region 1 | sub-region 1 |
| sub-region 2 | sub-region 2 |
| sub-region 3 | sub-region 3 |
| sub-region 4 | sub-region 4 |
| sub-region 5 | sub-region 5 |
| sub-region 6 | sub-region 6 |
| sub-region 7 | sub-region 7 |

It can be seen from Table 4 that, when the UE decodes its control channel successfully in sub-region 1 of the control region, its scheduled data channel repetitions are transmitted in sub-region 1 in the data region; when the UE decodes its control channel successfully in sub-region 2 of the control region, its scheduled data channel repetitions are transmitted in sub-region 2 in the data region; and so on.

Alternatively, in a second example, the monitored possible sub-region(s) of the control channel and the monitored possible sub-region(s) of the data channel that is scheduled by the control channel have a correspondence relationship. One instance is shown in Table 5 below.

TABLE 5

| CE level | Monitored possible sub-region(s) of control channel | Monitored possible sub-region(s) of scheduled data channel |
| --- | --- | --- |
| CE level 1 | Alt.1: sub-region 1 | sub-region 1 |
|  | Alt.2: sub-region 2 | sub-region 2 |
|  | Alt.3: sub-region 3 | sub-region 3 |
|  | Alt.4: sub-region 4 | sub-region 4 |
| CE level 2 | Alt.1: sub-region 1 + sub-region 5 | sub-region 1 + sub-region 5 |
|  | Alt 2: sub-region 3 + sub-region 6 | sub-region 3 + sub-region 6 |
| CE level 3 | Alt.1: sub-region 1 + sub-region 5 + sub-region 7 | sub-region 1 + sub-region 5 + sub-region 7 |

It can be seen from Table 5 that, if the UE in CE level 1 is configured to monitor sub-region 1 in the control region, its scheduled data channel will be transmitted in sub-region 1 in the data region; if the UE in CE level 2 is configured to monitor sub-region 1 and sub-region 5 (Alt.1) in the control region, its scheduled data channel can be transmitted in sub-region 1 or 5 in the data region and which sub-region is actually used can be blindly detected.

Alternatively, in a third example, the information on the sub-region for the data channel can be signaled in the control channel scheduling the data channel. For example, in the exemplary control region and data region shown in FIG. 5, the UE can use the control channel to signal the information of the specific sub-region for the data channel, that is, signal which of the seven sub-regions is used to transmit the data channel. Alternatively, the correspondence relationship as shown in Table 5 can be used together with the signaling to indicate which sub-region is used for the data channel. In particular, if the UE in CE level 1 is configured to monitor sub-region 1, 2, 3 or 4 in the control region, its scheduled data channel will be transmitted in sub-region 1, 2, 3 or 4 in the data region respectively. If the UE in CE level 2 is configured to monitor sub-region 1 and sub-region 5 (Alt.1) in the control region, its scheduled data channel can be transmitted in sub-region 1 or 5 in the data region and which sub-region of the sub-regions 1 and 5 is actually used is signaled in the scheduling control channel. For the UE in CE level 3, which sub-region of the sub-regions 1, 5 and 7 is actually used is signaled in the scheduling control channel. This example is illustrated in Table 6.

TABLE 6

| CE level | Monitored possible sub-region(s) of control channel | Monitored sub-region of scheduled data channel | Note |
| --- | --- | --- | --- |
| CE level 1 | Alt.1: sub-region 1 | sub-region 1 |  |
|  | Alt.2: sub-region 2 | sub-region 2 |  |
|  | Alt.3: sub-region 3 | sub-region 3 |  |
|  | Alt.4: sub-region 4 | sub-region 4 |  |
| CE level 2 | Alt.1: sub-region 1 + sub-region 5; | sub-region 1 or sub-region 5; | The information of data sub-region 1 or 5 is signaled in the scheduling control channel. |
|  | Alt.2: sub-region 3 + sub-region 6 | sub-region 3 or sub-region 6 | The information of data sub-region 3 or 6 is signaled in the scheduling control channel. |
| CE level 3 | Alt.1: sub-region 1 + sub-region 5 + sub-region 7 | sub-region 1 or sub-region 5 or sub-region 7 | The information of data sub-region 1, 5 or 7 is signaled in the scheduling control channel. |

In addition, as another example, if the UE in CE level 1 is configured to monitor any of sub-regions 1, 2, 3 and 4 in the control region, its scheduled data channel can be transmitted in any of sub-regions 1, 2, 3 and 4 in the data region, and which sub-region of the sub-regions 1, 2, 3 and 4 is actually used is signaled in the scheduling control channel.

In the above embodiments of transmitting repetitions of a data channel in connection with the control channel, it is possible to reduce the UE power consumption, and use smaller blind decoding times and smaller buffer size since the sub-region of the data channel can be indicated at least partly. In addition, these embodiments also have the benefits of reducing the signaling overhead and making the scheduling of data channel easier since the sub-region for the data channel can be related to the sub-region for the control channel scheduling the data channel.

Figure 6:
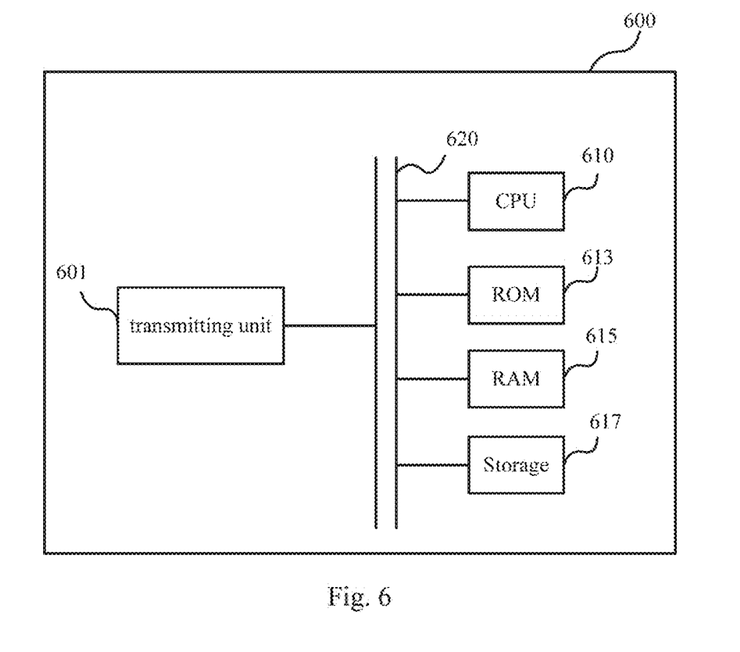
FIG. 6 schematically illustrates a block diagram of an eNB according to an embodiment of the present disclosure.

In the present disclosure, there are also provided an eNB and a UE for performing the above described methods. An embodiment of the present disclosure provides an eNB 600 for wireless communication as shown in FIG. 6 which schematically illustrates a block diagram of the eNB 600 according to an embodiment of the present disclosure. The eNB 600 can include a transmitting unit 601 configured to transmit repetitions of control channel(s) in a control region to a first UE in a coverage enhancement level, wherein the control region includes multiple sub-regions each of which can be used to transmit repetitions of one control channel; possible sub-region(s) allocated from the multiple sub-regions for transmitting one control channel to the first UE in the coverage enhancement level start from the same subframe; and the possible sub-region(s) for the first UE in the specific coverage enhancement level constitute a subset of a set of available sub-regions for the coverage enhancement level in the eNB's perspective. It is noted that the above descriptions and specific embodiments for method 200 can also be applied to the eNB 600. For example, the transmitting unit 601 can be further configured to transmit repetitions of a data channel in a sub-region of a data region to the first UE.

The eNB 600 according to the present disclosure may optionally include a CPU (Central Processing Unit) 610 for executing related programs to process various data and control operations of respective units in the eNB 600, a ROM (Read Only Memory) 613 for storing various programs required for performing various process and control by the CPU 610, a RAM (Random Access Memory) 615 for storing intermediate data temporarily produced in the procedure of process and control by the CPU 610, and/or a storage unit 617 for storing various programs, data and so on. The above transmitting unit 601, CPU 610, ROM 613, RAM 615 and/or storage unit 617 etc. may be interconnected via data and/or command bus 620 and transfer signals between one another.

Respective units as described above do not limit the scope of the present disclosure. According to one implementation of the disclosure, the functions of the above transmitting unit 601 may be implemented by hardware, and the above CPU 610, ROM 613, RAM 615 and/or storage unit 617 may not be necessary. Alternatively, the functions of the above transmitting unit 601 may also be implemented by functional software in combination with the above CPU 610, ROM 613, RAM 615 and/or storage unit 617 etc.

Figure 7:
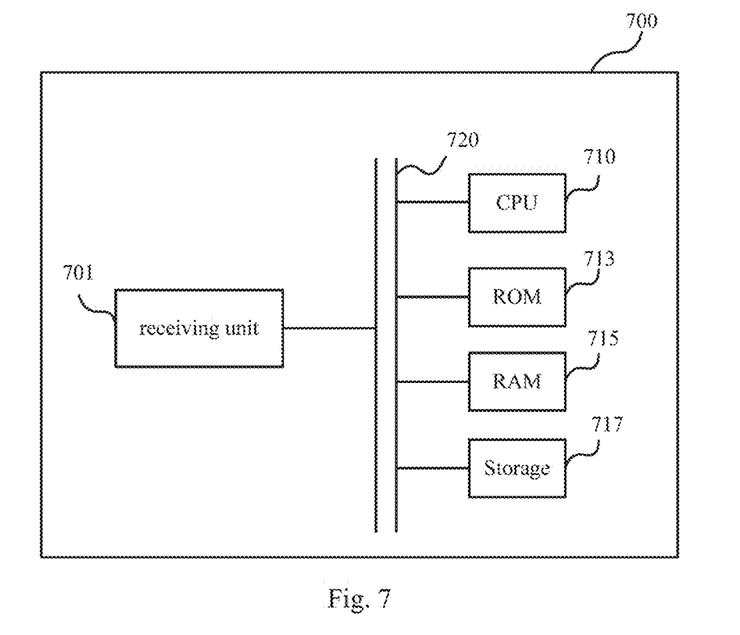
FIG. 7 schematically illustrates a block diagram of a UE according to an embodiment of the present disclosure.

An embodiment of the present disclosure provides a UE 700 for wireless communication as shown in FIG. 7 which schematically illustrates a block diagram of the UE 700 according to an embodiment of the present disclosure. The UE 700 can include a receiving unit 701 configured to receive repetitions of control channel(s) transmitted from an eNB in a control region to the UE in a coverage enhancement level, wherein the control region includes multiple sub-regions each of which can be used to transmit repetitions of one control channel; possible sub-region(s) that the UE in the coverage enhancement level needs to monitor for one control channel in the control channel start from the same subframe; and the possible sub-region(s) for the UE in the specific coverage enhancement level constitute a subset of a set of available sub-regions for the coverage enhancement level in the eNB's perspective. It is noted that the above descriptions and specific embodiments for method 300 can also be applied to the UE 700. For example, the receiving unit 701 can be further configured to receive repetitions of a data channel transmitted from the eNB in a sub-region of a data region.

The UE 700 according to the present disclosure may optionally include a CPU (Central Processing Unit) 710 for executing related programs to process various data and control operations of respective units in the UE 700, a ROM (Read Only Memory) 713 for storing various programs required for performing various process and control by the CPU 710, a RAM (Random Access Memory) 715 for storing intermediate data temporarily produced in the procedure of process and control by the CPU 710, and/or a storage unit 717 for storing various programs, data and so on. The above receiving unit 701, CPU 710, ROM 713, RAM 715 and/or storage unit 717 etc. may be interconnected via data and/or command bus 720 and transfer signals between one another.

Respective units as described above do not limit the scope of the present disclosure. According to one implementation of the disclosure, the functions of the above receiving unit 701 may be implemented by hardware, and the above CPU 710, ROM 713, RAM 715 and/or storage unit 717 may not be necessary. Alternatively, the functions of the above receiving unit 701 may also be implemented by functional software in combination with the above CPU 710, ROM 713, RAM 715 and/or storage unit 717 etc.

The present disclosure can be realized by software, hardware, or software in cooperation with hardware. Each functional block used in the description of each embodiment described above can be realized by an LSI as an integrated circuit. They may be individually formed as chips, or one chip may be formed so as to include a part or all of the functional blocks. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, an FPGA (Field Programmable Gate Array) that can be programmed after the manufacture of the LSI or a reconfigurable processor in which the connections and the settings of circuit cells disposed inside the LSI can be reconfigured may be used. Further, the calculation of each functional block can be performed by using calculating means, for example, including a DSP or a CPU, and the processing step of each function may be recorded on a recording medium as a program for execution. Furthermore, when a technology for implementing an integrated circuit that substitutes the LSI appears in accordance with the advancement of the semiconductor technology or other derivative technologies, it is apparent that the functional block may be integrated by using such technologies.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

What is claimed is:

1. A communication apparatus comprising:
   a receiver which, in operation, receives one or more repetitions of a control channel in one or more possible sub-regions,
   wherein the one or more possible sub-regions corresponding to a largest repetition number of the control channel include a first plurality of sub-regions which have different lengths,
   wherein the one or more possible sub-regions corresponding to a second-largest repetition number of the control channel include a second plurality of sub-regions which have different lengths, and
   wherein a number of starting subframes to which the one or more possible sub-regions corresponding to the second-largest repetition number of the control channel are mapped is greater than a number of starting subframes to which the one or more possible sub-regions corresponding to the largest repetition number of the control channel are mapped; and
   a decoder which, in operation, decodes the one or more repetitions of the control channel.

2. The communication apparatus according to claim 1, wherein the one or more possible sub-regions are determined based on the largest repetition number of the control channel or on the second-largest repetition number of the control channel.

3. The communication apparatus according to claim 1, wherein the one or more possible sub-regions corresponding to the largest repetition number of the control channel are mapped to a same starting subframe, and the one or more possible sub-regions corresponding to the second-largest repetition number of the control channel are mapped to a same starting subframe.

4. The communication apparatus according to claim 1, wherein the one or more possible sub-regions are determined based on physical layer signaling.

5. A communication method comprising:
   receiving, by a communication apparatus, one or more repetitions of a control channel in one or more possible sub-regions,
   wherein the one or more possible sub-regions corresponding to a largest repetition number of the control channel include a plurality of sub-regions which have different lengths,
   wherein the one or more possible sub-regions corresponding to a second-largest repetition number of the control channel include a first plurality of sub-regions which have different lengths, and
   wherein a number of starting subframes to which the one or more possible sub-regions corresponding to the second-largest repetition number of the control channel are mapped is greater than a number of starting subframes to which the one or more possible sub-regions corresponding to the largest repetition number of the control channel are mapped; and
   decoding, by the communication apparatus, the one or more repetitions of the control channel.

6. The communication method according to claim 5, wherein the one or more possible sub-regions are determined based on the largest repetition number of the control channel or on the second-largest repetition number of the control channel.

7. The communication method according to claim 5, wherein the one or more possible sub-regions corresponding to the largest repetition number of the control channel are mapped to a same starting subframe, and the one or more possible sub-regions corresponding to the second-largest repetition number of the control channel are mapped to a same starting subframe.

8. The communication method according to claim 5, wherein the one or more possible sub-regions are determined based on physical layer signaling.

* * * * *